United States Patent
Kaneko et al.

(10) Patent No.: US 11,256,411 B2
(45) Date of Patent: Feb. 22, 2022

(54) INTERFACE, CHARACTER INPUT GUIDE METHOD, AND PROGRAM

(71) Applicant: Sharp Kabushiki Kaisha, Sakai (JP)

(72) Inventors: Shota Kaneko, Sakai (JP); Tohru Nishikawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 725 days.

(21) Appl. No.: 15/598,340

(22) Filed: May 18, 2017

(65) Prior Publication Data

US 2017/0336965 A1  Nov. 23, 2017

(30) Foreign Application Priority Data

May 23, 2016 (JP) .............................. JP2016-102252

(51) Int. Cl.
*G06F 3/0488* (2013.01)
*G06F 3/023* (2006.01)
*G06F 3/01* (2006.01)

(52) U.S. Cl.
CPC .......... *G06F 3/04883* (2013.01); *G06F 3/018* (2013.01); *G06F 3/0233* (2013.01); *G06F 3/0236* (2013.01); *G06F 3/0488* (2013.01)

(58) Field of Classification Search
CPC ...... G06F 3/018; G06F 3/0233; G06F 3/0236; G06F 3/0488; G06F 3/04883; G06F 9/453

See application file for complete search history.

(56) References Cited

U.S. PATENT DOCUMENTS

| | | | | |
|---|---|---|---|---|
| 8,704,789 B2* | 4/2014 | Kusano | ............... | G06F 3/04883 715/863 |
| 8,825,474 B1* | 9/2014 | Zhai | ...................... | G06F 17/276 704/1 |
| 9,389,751 B2* | 7/2016 | Ohta | ...................... | G06F 3/0346 |
| 9,720,518 B2* | 8/2017 | Chung | ............... | G06F 3/04886 |
| 2011/0096096 A1* | 4/2011 | Matsuki | ............... | G03G 15/502 345/684 |
| 2013/0222249 A1* | 8/2013 | Pasquero | ............ | G06F 3/04886 345/168 |

(Continued)

FOREIGN PATENT DOCUMENTS

| | | |
|---|---|---|
| CN | 105051654 A | 11/2015 |
| JP | 2009-122993 A | 6/2009 |

(Continued)

*Primary Examiner* — Chau T Nguyen
(74) *Attorney, Agent, or Firm* — Keating & Bennett, LLP

(57) ABSTRACT

An interface performs a flick operation with a button selected from buttons of representative characters for each of the syllabic lines of the Japanese syllabary that are array-displayed on a touch panel so as to specify any one of Japanese characters assigned to the representative character in advance. The interface includes a storage unit that stores association information in which up, down, left, and right directions are set to each of the characters assigned to the representative characters in association with each button and a guide image display processing unit that displays a guide image guiding arrangement directions set to the characters assigned to the representative characters prior to selection of a button of the representative character in an outside of an array display region of the representative character.

2 Claims, 8 Drawing Sheets

(56) References Cited

U.S. PATENT DOCUMENTS

| | | | |
|---|---|---|---|
| 2014/0157126 A1* | 6/2014 | Kusano | G06F 3/0236 715/716 |
| 2015/0135121 A1* | 5/2015 | Peh | G06F 3/0488 715/773 |
| 2016/0048297 A1* | 2/2016 | Rhee | G06F 3/04886 715/773 |
| 2016/0054810 A1* | 2/2016 | Chung | G06F 3/04886 345/168 |
| 2016/0110101 A1* | 4/2016 | Chung | G06F 3/0237 715/773 |

FOREIGN PATENT DOCUMENTS

| | | |
|---|---|---|
| JP | 2012-074065 A | 4/2012 |
| JP | 2014-135708 A | 7/2014 |
| JP | 2015-207143 A | 11/2015 |

* cited by examiner

INTERFACE, CHARACTER INPUT GUIDE METHOD, AND PROGRAM

BACKGROUND

1. Field

The present disclosure relates to a technique of guiding a character input method for a touch panel of a mobile terminal such as a smartphone or a tablet and various devices.

2. Description of the Related Art

In recent years, in various electronic devices, a touch panel has been used as a man-machine interface. For example, character input using a touch panel is performed when array-displayed character buttons are selected and selected characters are displayed in order from the beginning in an input character display region. Meanwhile, as an effective character input method, a method using a tap operation (lightly touch) and a flick operation (slide) is available. More specifically, a method has been proposed with which representative characters and a plurality of characters belonging (assigned) to each of the representative characters are set in advance, the representative characters are array-displayed in a manner easy to identify as tap targets, and the assigned characters are selected by flicking. Furthermore, as a method of effectively guiding a flick direction in selection of the assigned characters, various guide techniques have been proposed (for example, see Japanese Unexamined Patent Application Publication No. 2012-74065 and Japanese Unexamined Patent Application Publication No. 2014-135708).

Japanese Unexamined Patent Application Publication No. 2012-74065 discloses a technique with which pressing a representative character causes changing to a guide image that uses a figure including four types of characters assigned in advance in up, down, left, and right directions of the representative character, whereby a flick direction is guided. Japanese Unexamined Patent Application Publication No. 2014-135708 discloses a guide technique described below. A character input screen is displayed in which each representative character is displayed in center of a button and, in upper, lower, left, and right regions in the frame of the button, four types of characters assigned in advance are displayed in small sizes with the representative character, as illustrated in FIGS. 21 to 23. When a representative character is selected, the button of the selected representative character is displayed in an enlarged manner, whereby a flick direction becomes easy to view.

Each of the techniques disclosed in Japanese Unexamined Patent Application Publication No. 2012-74065 and Japanese Unexamined Patent Application Publication No. 2014-135708 is a technique of guiding a flick direction with which an image displayed in a tap position is changed to an enlarged image or other, and a guide image that is separately displayed is not used. Furthermore, with the techniques, an adjacent character is hidden by the enlarged display or the like and becomes invisible, causing a trouble in an input operation of a next character.

It is desirable to provide an interface, a character input guide method, and a program that guide a quick and effective character input operation.

SUMMARY

According to an aspect of the disclosure, there is provided an interface for performing a flick operation with a button selected from buttons of a plurality of types of representative characters array-displayed on a touch panel so as to specify any one of a predetermined number of characters assigned to the corresponding representative character in advance, the interface including a storage unit configured to store information on an arrangement direction set for each of the characters assigned to the representative characters in a manner corresponding to each of the buttons and a guide image display processing unit configured to display a guide image that guides the arrangement direction set for each of the characters assigned to the representative character prior to selection of a button of the representative character in an outside of an array display region of the representative character.

Further, according to an aspect of the disclosure, there is provided a character input guide method for performing a flick operation with a button selected from buttons of a plurality of types of representative characters selectively array-displayed on a touch panel so as to specify any one of a predetermined number of characters assigned to the representative character of the button in advance, the character input guide method including storing information on an arrangement direction set for each of the characters assigned to the representative characters in a manner corresponding to each of the buttons and displaying a guide image that guides the arrangement direction set for each of the characters assigned to the representative character prior to selection of a button of the representative character in an outside of an array display region of the representative character.

Still further, according to an aspect of the disclosure, there is provided a program for an interface for performing a flick operation with a button selected from buttons of a plurality of types of representative characters array-displayed on a touch panel so as to specify any one of a predetermined number of characters assigned to the corresponding representative character in advance, the program causing the interface to function as a storage processing unit configured to cause a storage unit to store information on an arrangement direction set for each of the characters assigned to the representative characters in a manner corresponding to each of the buttons and a guide image display processing unit configured to display a guide image that guides the arrangement direction set for each of the characters assigned to the representative character prior to selection of a button of the representative character in an outside of an array display region of the representative character.

DESCRIPTION OF THE EMBODIMENTS

The present disclosure is applied to a character input method for a touch panel of a mobile terminal such as a smartphone or a tablet and other various devices. In the description below, the present disclosure is explained as an interface for character input applied to a smartphone. A smartphone includes e-mailing and browsing functions connectable to a network such as the Internet in addition to a call function as known, or a diary function or the like enabling a character input operation is also usable in the smartphone as appropriate. In e-mails, and in a browsing function also, as appropriate, a character input function is used as an interface.

Figure 1:
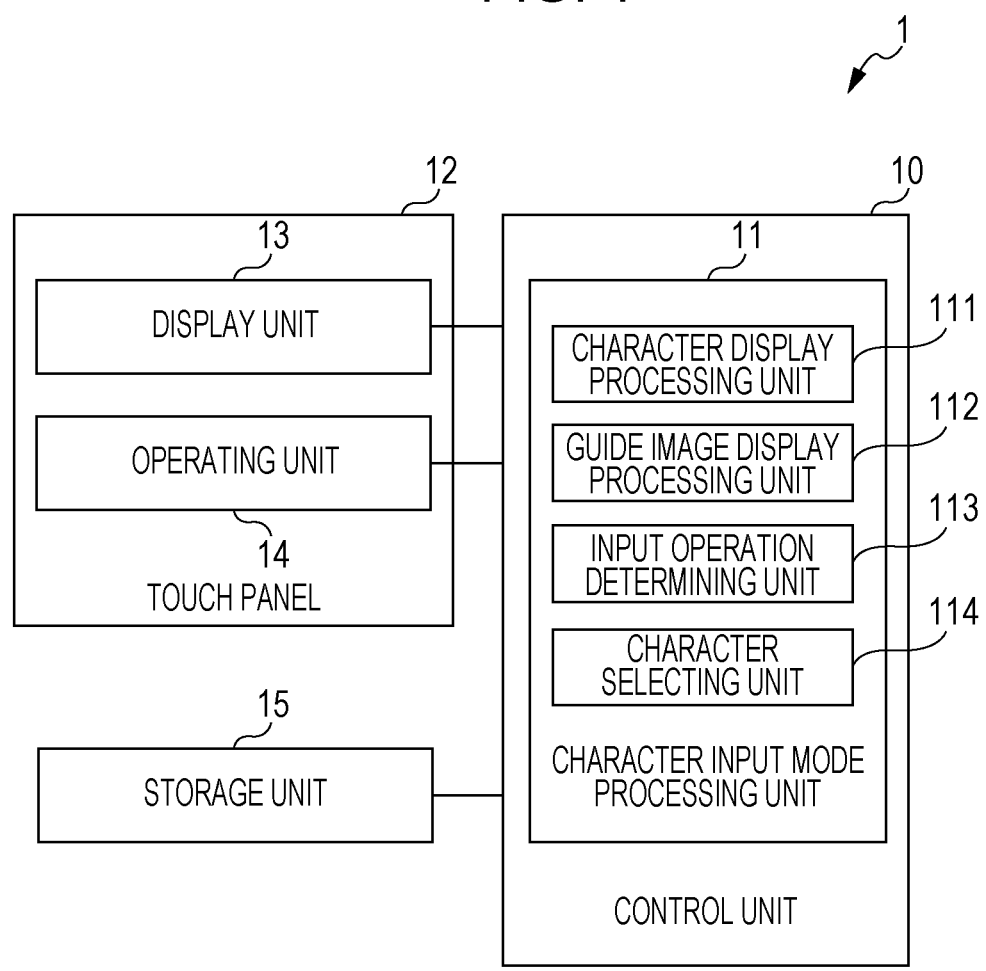
FIG. 1 is a block diagram explaining a function of an interface according to the present disclosure.

FIG. 1 mainly illustrates components of an interface 1 related to character input in a smartphone including various functions. The interface 1 includes a control unit 10 composed of a microcomputer and other parts, and the control unit 10 is equipped within a housing of the smartphone. The control unit 10 is communicably connected to a touch panel 12 and a storage unit 15 that stores therein requisite data or the like, which are provided in the housing of the smartphone.

The touch panel 12 includes a display unit 13 that displays an image and an operating unit 14 that is a thin-layer and transparent pressure sensitive element and is superimposed on a screen of the display unit 13. By associating a display address on the screen of the display unit 13 and detection coordinates obtained by the pressure sensitive element in advance at the side of the control unit 10, for example, information on touch-operated coordinates is replaced with the display address, enabling to determine which display image has been selected.

The storage unit 15 includes at least a memory unit that stores therein a control program controlling character input and a character input guide and requisite data or the like for processing and a work area unit that stores therein details of the processing temporarily.

The control unit 10 includes a character input mode processing unit 11 as one function. The control unit 10 reads out the control program in the storage unit 15 into the work area unit and executes the read control program, thereby functioning as the character input mode processing unit 11. The character input mode processing unit 11 includes a character display processing unit 111, a guide image display processing unit 112, an input operation determining unit 113, and a character selecting unit 114 in the present embodiment.

Figure 2:
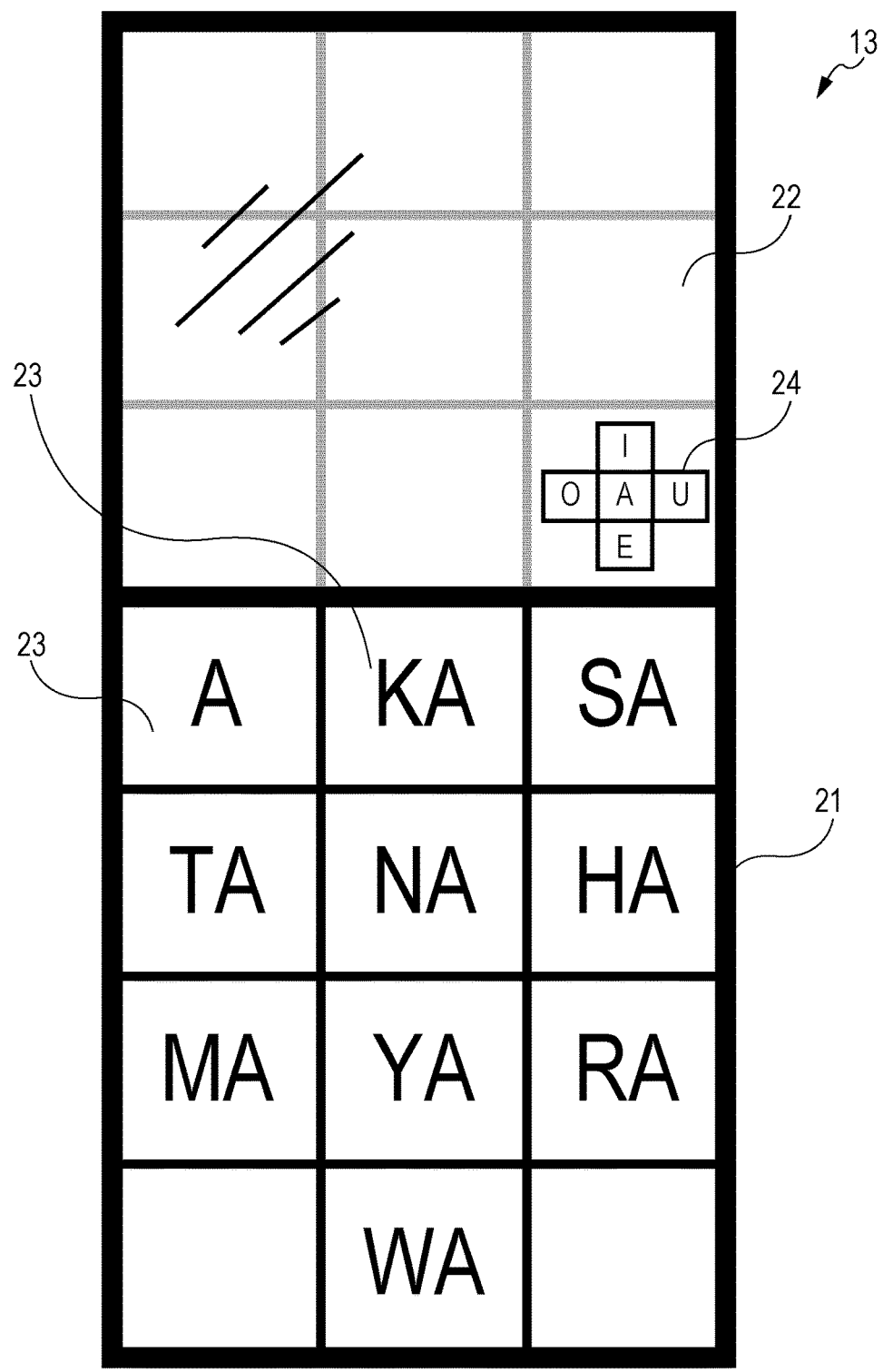
FIG. 2 is a screen diagram explaining a character input guide method according to a first embodiment.

The character display processing unit 111 performs processing of displaying a character set to be input on the display unit 13. For example, in FIG. 2 illustrating a first embodiment of a character input guide method, in the display unit 13, predetermined regions of the screen are set, the predetermined regions being, in this case, a display region 21 that displays a character set in the lower half part and a display region 22 that displays a character to be input in the upper half part. In the display region 21, buttons 23 each having a display frame for presenting a character are array-displayed. It is to be noted that in the display region 22, characters that have been input are displayed typically as a sentence from the beginning in accordance with an input order. Display or the like of input characters on the display region 22 is performed using a document creation and editing function as known, instead of the character display processing unit 111.

As described in FIG. 2, with respect to buttons 23, 23, . . . , head characters of the syllabic lines of the Japanese syllabary "A", "KA", "SA", . . . , "WA" are displayed in a predetermined array, for example, of four rows and three columns. It is to be noted that a head character of each syllabic line of the Japanese syllabary is treated as a representative character of the syllabic line and displayed in the corresponding button 23, and meanwhile, second and following characters of each syllabic line, for example, "i", "u", "e", and "o" with respect to a representative character "a", are treated as characters appointed (assigned) to the representative character "a". It is to be noted that selection processing with respect to a representative character and assigned characters thereof will be described later. Furthermore, in the following description, characters in a character input mode are not limited to Japanese characters and may include characters in various languages including English or other characters such as a symbol as appropriate.

Figure 3:
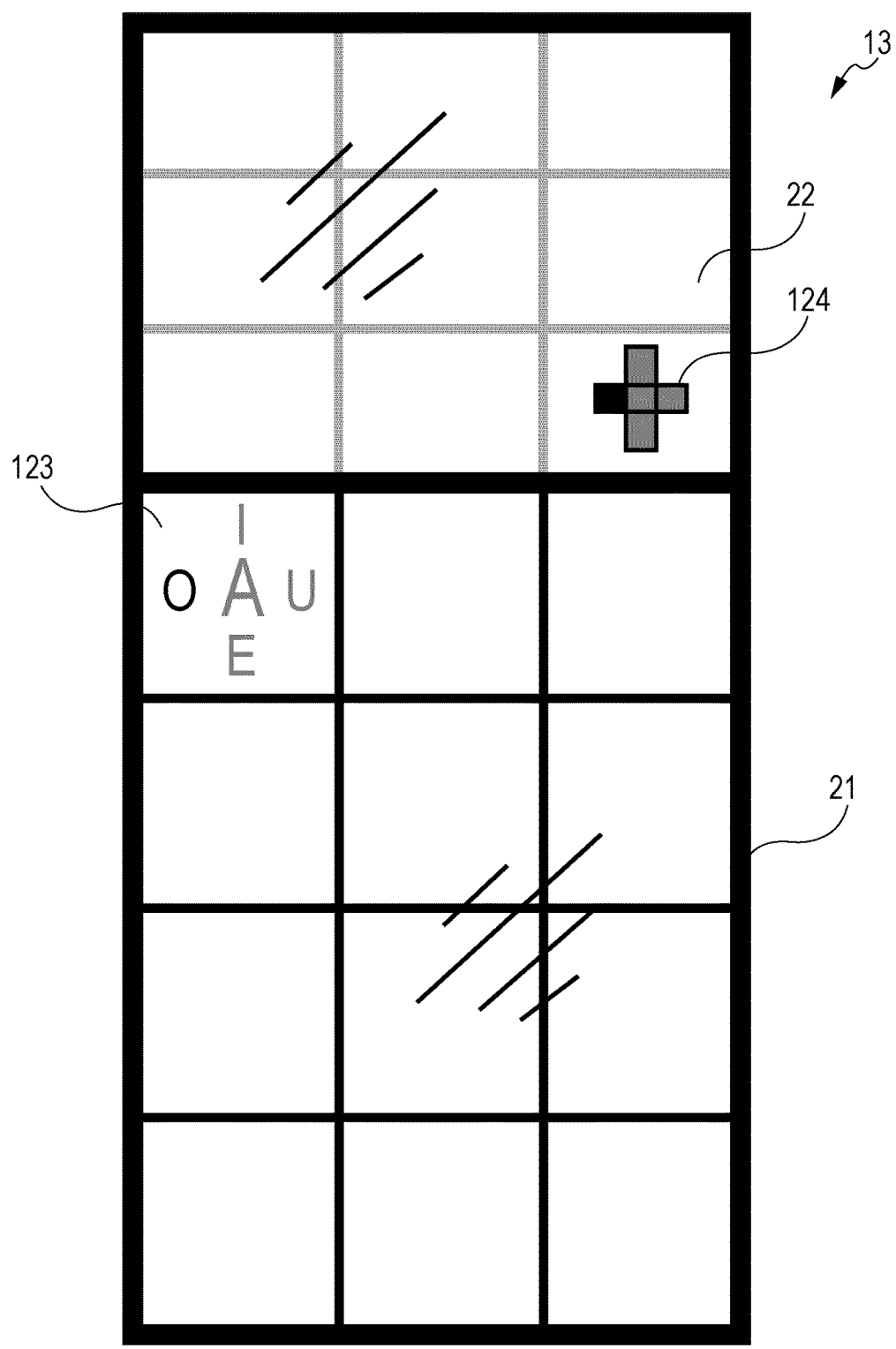
FIG. 3 is a screen diagram explaining a character input guide method according to a second embodiment.
Figure 4:
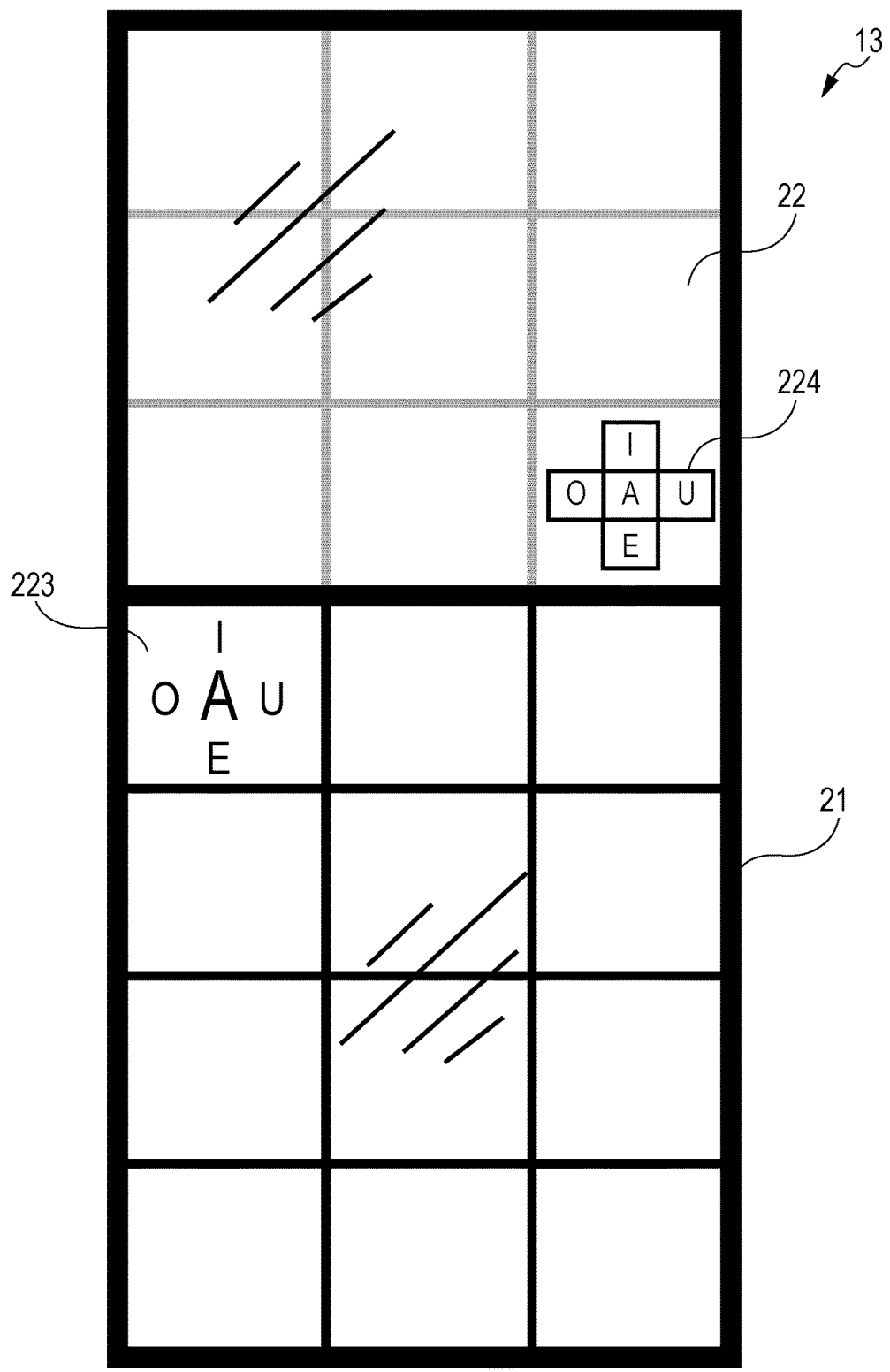
FIG. 4 is a screen diagram explaining a character input guide method according to a third embodiment.

Furthermore, the character display processing unit 111 may display a button 123 in color, as illustrated in FIG. 3 presenting a second embodiment of a character input guide method, or may display a button 223 in monochrome, as illustrated in FIG. 4 presenting a third embodiment of a character input guide method. It is to be noted that in FIGS. 3 and 4, display of buttons other than that for the "a" syllabic line is omitted. Forms of the buttons 123 and 223 will be described later.

The guide image display processing unit 112 displays a guide image that guides character input in an outside of the display region 21, typically using a part of the display region 22 while performing change display of the displayed image in response to a character input operation, as described later. It is to be noted that the guide image display processing unit 112 performs display of a guide image 24 (see FIG. 2), a guide image 124 (see FIG. 3), and a guide image 224 (see FIG. 4) in accordance with the corresponding embodiment.

The input operation determining unit 113 detects continuous operations to the touch panel 12 in the character input mode. Upon detecting a touch operation to the display region 21, the input operation determining unit 113 detects coordinates of a touched position and specifies the button 23 displayed in the corresponding position from the detected coordinates.

Furthermore, after a touch, when the input operation determining unit 113 detects a flick operation on the display region 21 or the like, out of continuous transitions of a detection position, the input operation determining unit 113 detects a flick direction. More specifically, upon determining a flick operation, the input operation determining unit 113 detects coordinates touched when the touch panel 12 is lightly touched and a sliding direction from the position of the coordinates.

When the input operation determining unit 113 has detected a touch operation, the character selecting unit 114 determines that selection of the corresponding button 23 has been fixed. For example, when an inside of a display frame of the button 23 in which the representative character "A" of the "a" syllabic line is displayed is touched (determined as a tap), it is determined that the representative character "A" itself has been selected. Furthermore, after a touch, when a flick operation such as sliding from that position has been performed, the character selecting unit 114 determines that a character assigned to the direction of the flick operation from the position of the touch has been selected. It is to be noted that the character for which selection has been fixed is displayed in the display region 22.

A relationship among a direction of an assigned character, display, and selection will now be described. For example, in FIG. 3, in the button 123, a representative character is displayed in a relatively large size in center of the display frame. In a manner assigned in advance to the periphery, for example, upper, lower, left, and right sides of the representative character, a predetermined number of, for example, four characters are displayed in relatively small sizes. In FIG. 3, a character "I" is displayed on the upper side of the representative character "A", a character "U" is displayed on the right side of the representative character "A", a character "E" is displayed on the lower side of the representative character "A", and a character "O" is displayed on the left side of the representative character "A". It is to be noted that a positional relationship for display between a representative character and characters assigned to the representative character in FIG. 4 is the same as that in FIG. 3.

Furthermore, characters assigned to a representative character are associated with flick directions which are upper, lower, left, and right directions (arrangement directions) from the representative character, with respect to the coordinates of the button 123 of the representative character. This association information is written into the storage unit 15 in advance by the control unit 10. Accordingly, the character selecting unit 114 specifies an assigned character using a flick start position and a flick direction as well as the association information in the storage unit 15. This processing is common to FIGS. 2 to 4.

Next, with reference to FIGS. 2 to 4, the buttons 23, 123, and 223 and the guide images 24, 124, and 224 will be described. Firstly, in FIG. 2, the guide image 24 is displayed in a part of the display region 22. The guide image 24 is displayed in a manner that the representative character of the "a" syllabic line and the assigned characters thereof are associated in upper, lower, left, and right directions, as an example. The guide image 24 corresponds to the positional relationship between a representative character and assigned characters thereof stored in the storage unit 15 and thus guides a selection operation of a desired character.

In FIG. 3, in the button 123, a representative character and assigned characters thereof are displayed, and to each of the characters, a different color is set. For example, red is set to the representative character in center as a reference position, blue is set to the character on the upper side, green is set to the character on the right side, purple is set to the character on the lower side, and black is set to the character on the left side. Meanwhile, the guide image 124 is cross-shaped, and to each of a square in center and squares on upper, lower, left, and right sides, a color that is the same as the color set to the corresponding position in the button 123 is set. In this example, by referring to the colors and directions of the guide image 124, the assigned characters are able to be viewed easily.

In FIG. 4, although the button 223 has the same form as in FIG. 3, the displayed characters are not associated with colors, and typically displayed in monochrome. Furthermore, the guide image 224 is the same as in FIG. 2.

Subsequently, character input guide methods in the embodiments related to display forms illustrated in FIGS. 2, 3, and 4 will be described using flowcharts in FIGS. 5 to 7. It is to be noted that each flowchart presents only a change in a touch operation, a flick operation, and details of display, and processing with respect to a selected character is omitted.

Figure 5:
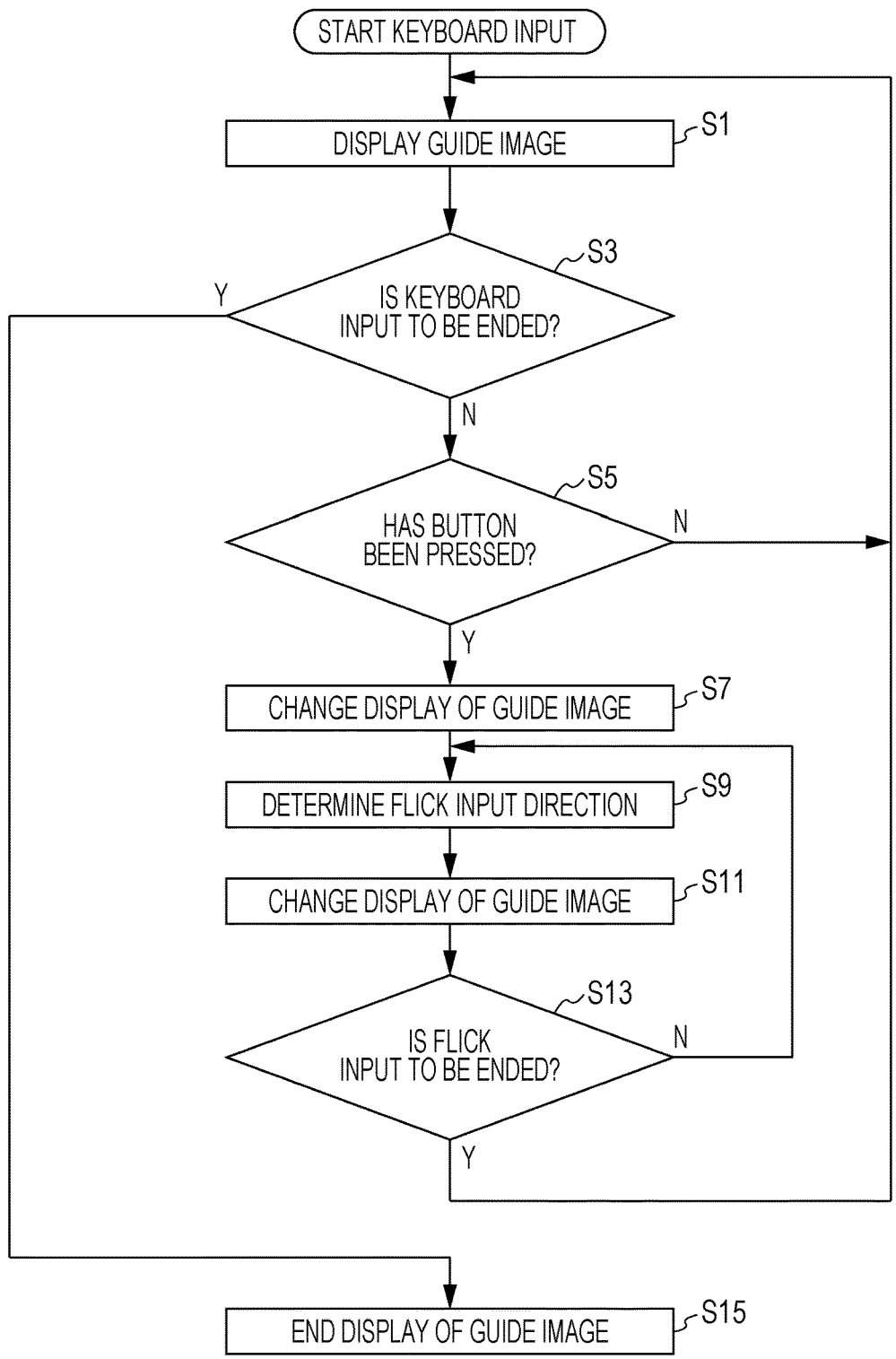
FIG. 5 is a flowchart explaining the character input guide method according to the first embodiment.

FIG. 5 is a flowchart illustrating the character input guide method according to the first embodiment. Firstly, keyboard input (the character input mode) is started, and as illustrated in FIG. 2, together with display of the buttons 23, display of the guide image 24 is performed (Step S1). Next, it is determined whether the keyboard input (the character input mode) is to be ended (Step S3), and when the keyboard input is not to be ended, it is determined whether any of the buttons 23 has been pressed (touched) (Step S5).

When none of the buttons 23 has been touched, the processing returns to Step S1. When any of the buttons 23 has been touched, next, display of the guide image 24 is changed (Step S7). More specifically, when a button 23 that has been touched is specified by the character selecting unit 114, the guide image display processing unit 112 changes the current guide image 24 to a guide image 24 associated with the touched button 23. For example, if the guide image 24 in which the representative character "A" is displayed at first, and in that state, it is determined that a button 23 corresponding to the representative character "KA" has been touched, the guide image 24 is changed to a guide image 24 in which the representative character "KA" is displayed. With this, characters of a syllabic line that belongs to a specifically touched character are displayed as the guide image 24. After that, the guide image 24 corresponding to a representative character touched the last time is to be sequentially changed to a guide image 24 corresponding to a representative character touched next. Furthermore, display of the button 23 selected by a touch operation may be enlarged by a magnification factor to a degree that superimposition of the enlarged display on an adjacent button does not cause a trouble.

Next, a determination of a flick input direction is performed (Step S9). When a flick input direction has been determined, in accordance with a result of the determination, display of the guide image 24 is changed (Step S11). More specifically, in the guide image 24, a display form of a part of a character that corresponds to the flick input direction is changed. It is to be noted that in the determination of a flick input direction, when a flick operation such as a flick input direction has not been determined, a display form of a part of a representative character in the guide image 24 is changed. This enables an operator to check whether the current touch operation and flick operation are intended ones. It is to be noted that a change of a display form may include changes of various items such as a color, density, size, thickness, and blinking.

Next, it is determined whether the flick input has been ended (Step S13), and when the flick input has not been ended, the processing returns to Step S9 and the same processing of changing display of the guide image as described above is repeated. On the other hand, when the flick input has been ended, the processing returns to Step S1 and the same processing as described above is repeated. Furthermore, at Step S3, when the keyboard input (the character input mode) has been ended, the display of the guide image 24 is erased (Step S15).

It is to be noted that the guide image 24 may be sequentially changed to those of other syllabic lines at a predetermined interval of time, during a period in which no touch operation is detected.

Figure 6:
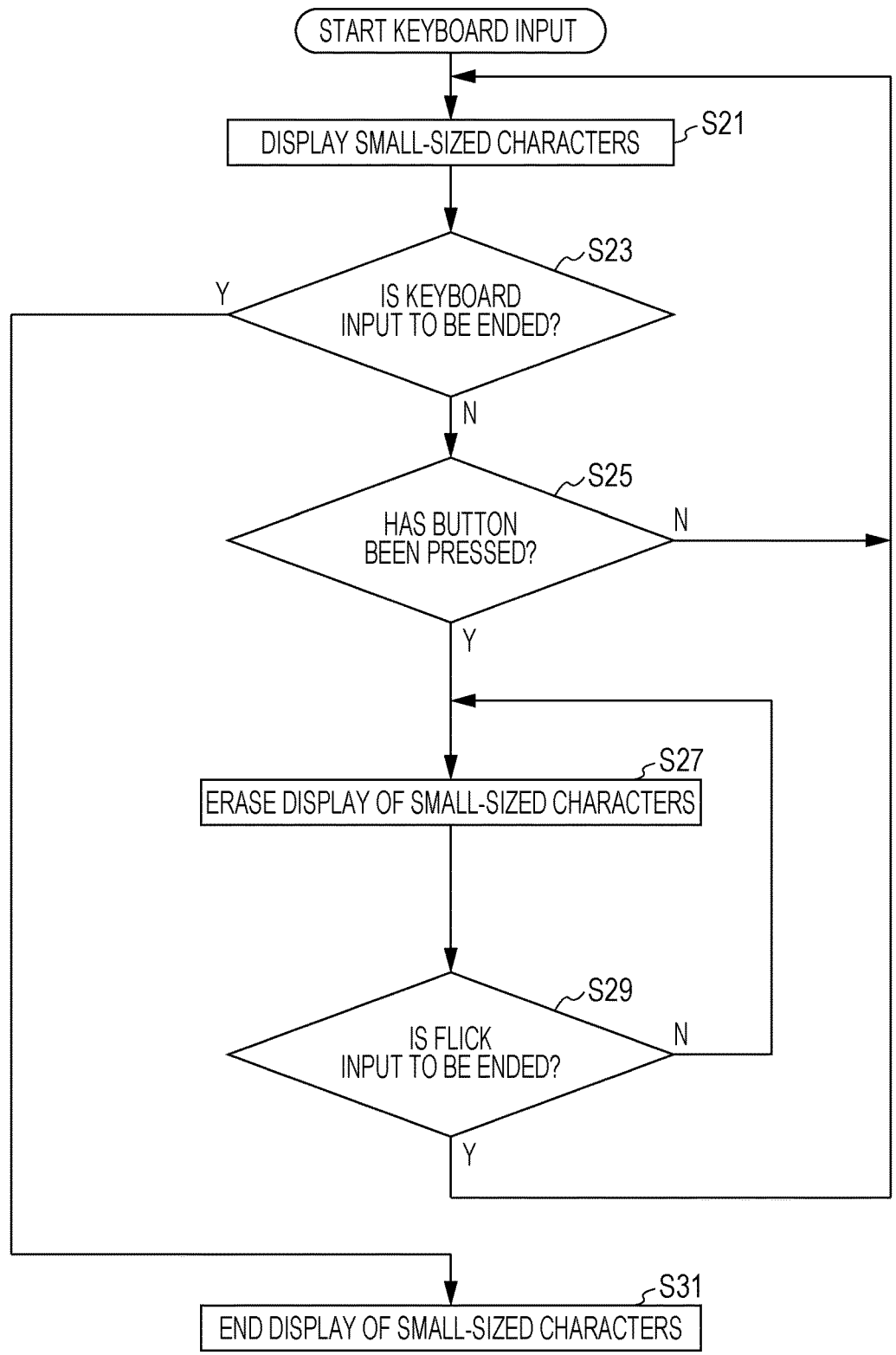
FIG. 6 is a flowchart explaining the character input guide method according to the second embodiment.

FIG. 6 is a flowchart illustrating the character input guide method according to the second embodiment. Firstly, keyboard input (the character input mode) is started, and as illustrated in FIG. 3, together with display of the buttons 123 with small-sized characters, display of the guide image 124 is performed (Step S21). Next, it is determined whether the keyboard input (the character input mode) is to be ended (Step S23), and when the keyboard input is not to be ended, it is determined whether any of the buttons 123 has been touched (Step S25).

When none of the buttons 123 has been touched, the processing returns to Step S21. When any of the buttons 123 has been touched, display of assigned characters (small-sized characters) inside the button 123 is erased by the character display processing unit 111 (Step S27). It is to be noted that display of the button 123 selected by the touch operation may be enlarged by a magnification factor to a degree that superimposition of the enlarged display on an adjacent button does not cause a trouble.

Next, it is determined whether the flick input has been ended (Step S29), and when the flick input has not been ended, the processing returns to Step S27 and the same processing of changing display of the guide image as described above is repeated. On the other hand, when the flick input has been ended, the processing returns to Step S21 and the same processing as described above is repeated. Furthermore, at Step S23, when the keyboard input (the character input mode) has been ended, the display of the buttons 123 with small-sized characters is erased (Step S31).

Figure 7:
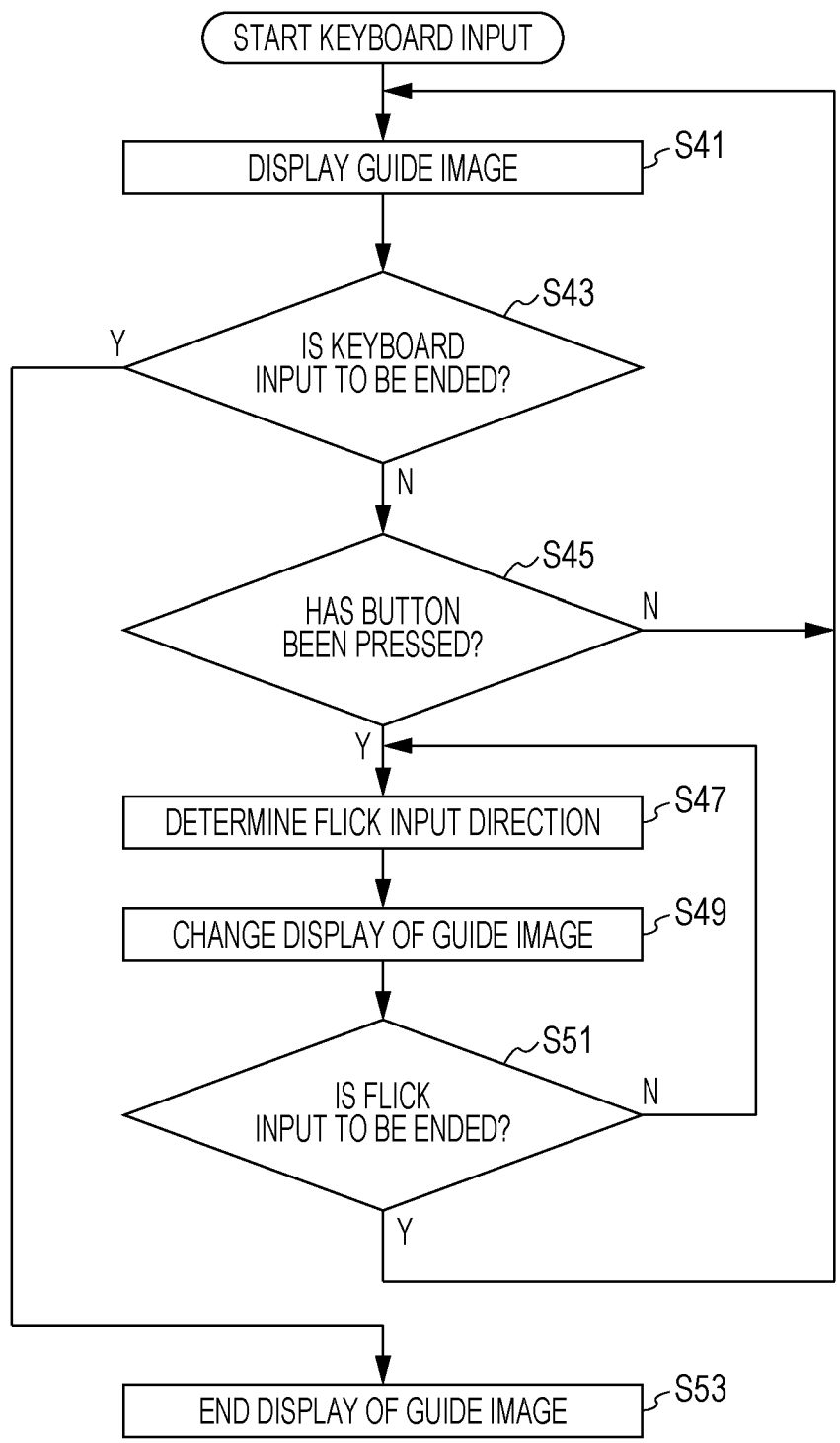
FIG. 7 is a flowchart explaining the character input guide method according to the third embodiment.

FIG. 7 is a flowchart illustrating the character input guide method according to the third embodiment. Firstly, keyboard input (the character input mode) is started, and as illustrated in FIG. 4, together with display of the buttons 223, display of the guide image 224 is performed (Step S41). Next, it is determined whether the keyboard input (the character input mode) is to be ended (Step S43), and when the keyboard input is not to be ended, it is determined whether any of the buttons 223 has been touched (Step S45).

When none of the buttons 223 has been touched, the processing returns to Step S41. When any of the buttons 223 has been touched, next, a determination of a flick input direction is performed (Step S47). It is to be noted that display of the button 223 selected by the touch operation may be enlarged by a magnification factor to a degree that superimposition of the enlarged display on an adjacent button does not cause a trouble.

Figure 8A:
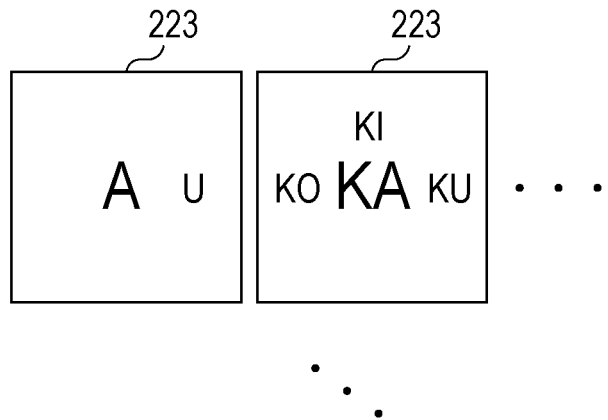
FIGS. 8A to 8C are screen diagrams illustrating an example of enlarged display with respect to a touched button.
Figure 8B:
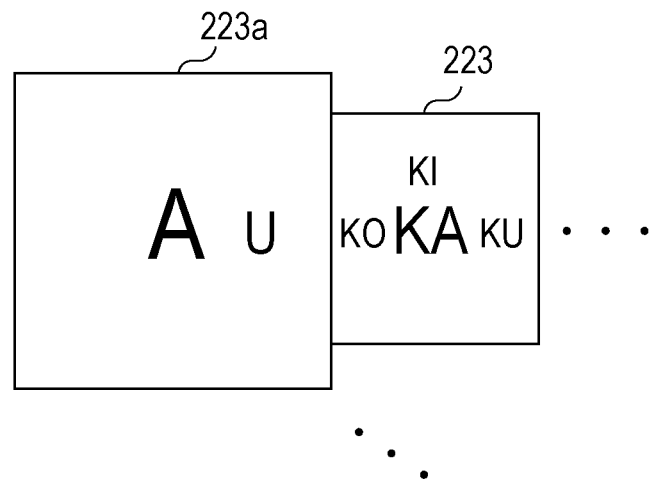
Figure 8C:
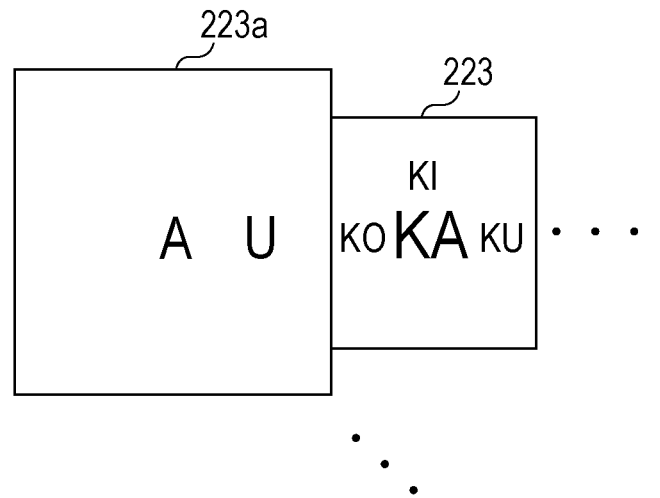

FIGS. 8A to 8C illustrate an example of enlarged display with respect to a touched button. In a screen in FIG. 8A, for example, when the button 223 in which the representative character "A" is displayed is touched, the button 223 is enlarged to become an enlarged button 223a (see FIGS. 8B and 8C). The enlarged button 223a is enlarged to a degree that a character that is the most neighboring out of assigned characters of an adjacent button 223 (in the example in FIGS. 8A to 8C, a character "KO" in the button 223 in which the representative character "KA" is displayed) is not hidden. It is to be noted that FIG. 8B illustrates a state in which a character in the button 223a is also enlarged similarly, and FIG. 8C illustrates a state in which an assigned character is enlarged. With this, a character in a selected button is enlarged to improve viewability, thereby enabling easy guiding.

Next, once a flick input direction has been determined, in accordance with a result of the determination, display of the guide image 224 is changed (Step S49). More specifically, in the guide image 224, a display form of a part of a character that corresponds to the flick input direction is changed. It is to be noted that in the determination of the flick input direction, when a flick operation has not been determined, a display form of a part of a representative character in the guide image 224 is changed. This enables an operator to check whether the current touch operation and flick operation are intended ones. It is to be noted that a change of a display form may include changes of various items such as a color, density, size, thickness, and blinking.

Next, it is determined whether the flick input has been ended (Step S51), and when the flick input has not been ended, the processing returns to Step S47 and the same processing of changing display of the guide image as described above is repeated. On the other hand, when the flick input has been ended, the processing returns to Step S41 and the same processing as described above is repeated. Furthermore, at Step S43, when the keyboard input (the character input mode) has been ended, the display of the guide image 224 is erased (Step S53). It is to be noted that the guide image 24 may be sequentially changed to other syllabic lines at a predetermined interval of time, during a period in which no touch operation is detected.

In the above-described embodiments, the number of characters assigned to a representative character is four. However, any number may be assigned in a manner corresponding to a character in a language or a symbol as appropriate. Furthermore, the arrangement directions of the assigned characters are up, down, left, and right directions in the above-described embodiments. However, the embodiments are not limited thereto, and a prescribed combination of up, down, left, and right directions may be employed. Alternatively, a mode in which a direction other than up, down, left, and right directions is included may be employed. For example, the directions may be up, obliquely down to right, and obliquely down to left.

Furthermore, the descriptions of the above-described embodiments merely present examples in all aspects and have to be regarded as non-limiting. The scope of the present disclosure is presented not by the above-described embodiments but by the claims. Furthermore, in the scope of the present disclosure, all modifications made within the meaning and the scope equivalent to those of the claims are intended to be included.

The present disclosure contains subject matter related to that disclosed in Japanese Priority Patent Application JP 2016-102252 filed in the Japan Patent Office on May 23, 2016, the entire contents of which are hereby incorporated by reference.

What is claimed is:

1. An input guide method for performing a flick operation, the input guide method accepting a touch operation to a button selected from buttons that array-display representative characters on a touch panel, and then accepting the flick operation to the button so as to specify an assigned character selected from predetermined assigned characters that are assigned to a representative character corresponding to the button, the input guide method comprising:
 storing the buttons and information of each of the buttons, the information including:
  display coordinate information indicating a coordinate of a button on the touch panel, and
  arrangement direction corresponding information of the assigned characters that indicates arrangement directions of the assigned characters respectively,
 storing a guide image that corresponds to the display coordinate information and the arrangement direction corresponding information,
 reading out the buttons and the display coordinate information of the buttons, and displaying the buttons in an array-display area on the touch panel based on the display coordinate information,
 reading out the guide image, displaying the guide image outside the array-display area on the touch panel, and displaying the guide image in a portion of a display region that displays an input character on the touch panel,
 displaying, in the guide image and in different colors, portions corresponding to a representative character and assigned characters, detecting a touch operation to a button and a flick operation based on a continuous transition of a detection position of the touch operation, and selecting a representative character of a button when the touch operation to the button is detected, and selecting an assigned character assigned to a flick direction when a flick operation is detected.

2. A non-transitory computer readable medium including a program for an interface for performing a flick operation, the interface accepting a touch operation to a button selected from buttons that array-display representative characters on a touch panel, and then accepting the flick operation to the button so as to specify an assigned character selected from predetermined assigned characters that are assigned to a representative character corresponding to the button, the program causes performance of:

storing the buttons and information of each of the buttons, the information including:

display coordinate information indicating a coordinate of a button on the touch panel, and arrangement direction corresponding information of the assigned characters that indicates arrangement directions of the assigned characters respectively, storing a guide image that corresponds to the display coordinate information and the arrangement direction corresponding information, reading out the buttons and the display coordinate information of the buttons, and displaying the buttons in an array-display area on the touch panel based on the display coordinate information, reading out the guide image, displaying the guide image outside the array-display area on the touch panel, and displaying the guide image in a portion of a display region that displays an input character on the touch panel, displaying, in the guide image and in different colors, portions corresponding to a representative character and assigned characters, detecting a touch operation to a button and a flick operation based on a continuous transition of a detection position of the touch operation, and selecting a representative character of a button when the touch operation to the button is detected, and selecting an assigned character assigned to a flick direction when a flick operation is detected.

* * * * *